United States Patent [19]

Sterling

[11] Patent Number: 5,685,152

[45] Date of Patent: Nov. 11, 1997

[54] APPARATUS AND METHOD FOR CONVERTING THERMAL ENERGY TO MECHANICAL ENERGY

[76] Inventor: Jeffrey S. Sterling, 21251 SW. 228 St., Miami, Fla. 33170

[21] Appl. No.: 425,992

[22] Filed: Apr. 19, 1995

[51] Int. Cl.⁶ ................................................. B60R 16/00
[52] U.S. Cl. ............................... 60/641.8; 60/641.15
[58] Field of Search ........................ 60/641.8, 641.15, 60/659, 652, 648; 62/434, 235.1

[56] References Cited

U.S. PATENT DOCUMENTS

| | | | |
|---|---|---|---|
| 659,450 | 10/1900 | McHenry | 60/641.8 |
| 2,713,252 | 7/1955 | Jackson et al. | 62/235.1 |
| 2,942,411 | 6/1960 | Hutching | 60/641.8 |
| 3,152,442 | 10/1964 | Rowekamp | 60/641.8 |
| 4,007,776 | 2/1977 | Alkasab | 165/18 |
| 4,011,731 | 3/1977 | Meckler | 60/235.1 |
| 4,094,147 | 6/1978 | Alleau | 60/641.8 |
| 4,103,493 | 8/1978 | Schoenfelder | 60/648 |
| 4,171,619 | 10/1979 | Clark | 62/235.1 |
| 4,222,244 | 9/1980 | Meckler | 62/235.1 |
| 4,285,211 | 8/1981 | Clark | 62/235.1 |
| 4,300,540 | 11/1981 | Gray | 60/641.8 |
| 4,386,501 | 6/1983 | Jaeger | 62/235.1 |
| 4,394,814 | 7/1983 | Wardman et al. | 60/641.8 |
| 4,512,157 | 4/1985 | Weadock | 60/641.8 |
| 4,926,643 | 5/1990 | Johnston | 60/641.8 |
| 5,005,360 | 4/1991 | McMurtry | 60/641.8 |
| 5,177,977 | 1/1993 | Larson | 62/235.1 |
| 5,444,972 | 8/1995 | Moore | 60/641.8 |

*Primary Examiner*—Ira S. Lazarus
*Assistant Examiner*—Alfred Basichas
*Attorney, Agent, or Firm*—Jones & Askew

[57] ABSTRACT

A thermal energy storage and conversion system that captures thermal energy from solar collectors, stores thermal energy in a first heated medium, converts a portion of stored thermal energy to mechanical energy by utilization of a heat engine, converts a second portion of stored thermal energy to a thermal energy sink by utilization of a refrigeration device, and stores a portion of thermal energy sink for use later. While the sun is shining, energy is collected and stored in first heated medium. Both during day and night, a portion of stored energy in first heated storage medium is transferred to first refrigerant that vaporizes and provides mechanical energy to heat engine. A second portion of stored thermal energy in first heated medium is transferred, as needed, to second refrigerant which vaporizes and removes from second fluid medium a quantity of heat including second fluid medium's heat of fusion, thereby freezing the second medium. Solidified second medium then provides, during both day and night, a low temperature heat sink to help drive heat engine, a low temperature source of refrigeration for cooling an enclosed space, and an efficient, compact, and user friendly energy storage device.

5 Claims, 6 Drawing Sheets

Fig_1

Fig_2

Fig_3

Fig_4

Fig-5

APPARATUS AND METHOD FOR CONVERTING THERMAL ENERGY TO MECHANICAL ENERGY

TECHNICAL FIELD

The present invention relates to an energy storage and conversion system, and more particularly to a system in which thermal energy is collected, stored by a heated medium, stored by a cooled medium for use as a thermal heat sink, and converted to mechanical energy.

BACKGROUND-DESCRIPTION OF PRIOR ART

Solar energy is a prime source of Thermal energy. Solar Energy capture systems utilize thermal energy for heating purposes. Solar collectors capture thermal energy, and acting as heat exchangers, transfer the thermal energy from the sun's rays to a heated fluid. That fluid may then be consumed, or stored in an insulated container for later use. For example, solar panels installed on rooftops of houses and buildings are part of systems that supply thermal energy to heat water consumed in these structures.

One example of a solar heating and cooling system is disclosed in Alkasab U.S. Pat. No. 4,007,776. Alkasab discloses a solar energy system which includes a heating circuit and a refrigeration circuit. A solar Collector heats a circulating fluid. The heated fluid is delivered by means of three way valves to either the heating circuit or the cooling circuit. The heating circuit delivers heat to an enclosed space by simply circulating the heated fluid to a heat exchanger in the enclosed space. When used in the cooling mode, the heated fluid is used to vaporize a refrigerant which is then condensed and delivered to an evaporator for cooling the enclosed space. While Alkasab is capable of harnessing solar energy for both heating and cooling, the use of the system is limited because the system runs discretely either in a heating or cooling mode. The solar energy cannot be captured and stored simultaneously in both modes. Moreover, the Alkasab system has no provisions for creating mechanical energy directly from solar energy or mechanical energy from solar energy stored as thermal energy. Therefore, there is a need for an improved thermal energy conversion and storage system for storing thermal energy for later conversion to mechanical energy and for converting stored thermal energy to mechanical energy.

OBJECTS AND ADVANTAGES

It is an object of this invention to provide an energy storage and conversion system to store thermal energy and to convert thermal energy into mechanical energy and refrigeration.

It is an object of this invention to provide an energy storage and conversion system to store thermal energy in a heated media, to convert a portion of the stored thermal energy to mechanical energy by use of a heat engine, to convert a second portion of the stored thermal energy to a thermal energy sink by use of a refrigeration device, and to store a portion of the thermal energy sink for use later.

It is also an object of the present invention to provide an energy storage and conversion system for converting thermal energy derived from the sun to mechanical energy which system includes a solar collection means that captures solar energy while the sun is shining and stores solar energy as thermal energy in a media, a heat engine circuit including a liquid refrigerant that absorbs thermal energy from the heated media to vaporize the refrigerant, uses the gas phase of the refrigerant to drive a heat engine, condenses the spent gas phase of the refrigerant to its liquid phase using an ambient thermal heat sink, and returns the liquified refrigerant, to absorb thermal energy again from the solar heated fluid (3rd embodiment).

It is likewise an object of the present invention to provide an energy storage and conversion system for converting thermal energy derived from the sun to mechanical energy which system includes a solar collection means that captures solar energy while the sun is shining and stores solar energy as thermal energy in a media, a heat engine circuit including a liquid refrigerant that absorbs thermal energy from the heated media to vaporize the refrigerant, uses the gas phase of the refrigerant to drive a heat engine, condenses the spent gas phase of the refrigerant to its liquid phase using a thermal heat sink (artificial low temperature heat exchanger) and returns the liquified refrigerant to absorb thermal energy again from the solar heated fluid, and a refrigeration circuit that absorbs thermal energy from the heated media to vaporize a second liquid refrigerant, uses the gas phase of the second refrigerant in one of several ways known to the art to produce a refrigeration effect in a second medium, uses a portion of the refrigerated, second medium as a thermal heat sink to condense the spent gas phase of the first refrigerant exiting the heat engine, and stores a portion of the refrigerated second medium for use as a thermal heat sink at a later time.

It is an ancillary object of the present invention to provide an energy storage and conversion system that uses thermal energy derived from the sun to cool an enclosed space as a product of the conversion of the thermal energy in the heated fluid media to refrigeration in the cooled fluid medium.

The present invention is an energy conversion and storage system for capturing thermal energy from solar collectors when the sun is shining, storing thermal energy as a heated fluid, converting a portion of the stored thermal energy to mechanical energy by utilization of a heat engine, converting a second portion of the stored thermal energy to an artificially low temperature thermal energy sink by utilization of a refrigeration device, and storing a portion of the thermal energy sink for use later when the sun is not available.

The solar energy conversion and storage system of the present invention captures the thermal energy of the sun while the sun is shining, stores the captured thermal energy, converts a portion of the stored thermal energy to mechanical energy continually, converts a portion of the stored thermal energy to a refrigerated thermal heat sink, stores the refrigerated thermal heat sink, cools and condenses the gaseous refrigerant exhaust from the heat engine using a portion of the heat sink, and cools an enclosed space, continually.

In one embodiment of the present invention, the energy conversion and storage system of the present invention includes a solar collection circuit for capturing solar energy as thermal energy while the sun is shining, a heat engine circuit for converting a portion of the thermal energy captured by the solar collection circuit to mechanical energy, and a refrigeration circuit for converting a portion of the thermal energy captured by the solar collection circuit to a thermal energy sink.

Particularly, in the first embodiment, the solar collection circuit includes a solar collector, a first thermal energy heat exchanger, a first thermally insulated container for holding a fluid medium, and a means for circulating a fluid through the solar collector and the first thermal energy heat exchanger.

Figure 2:
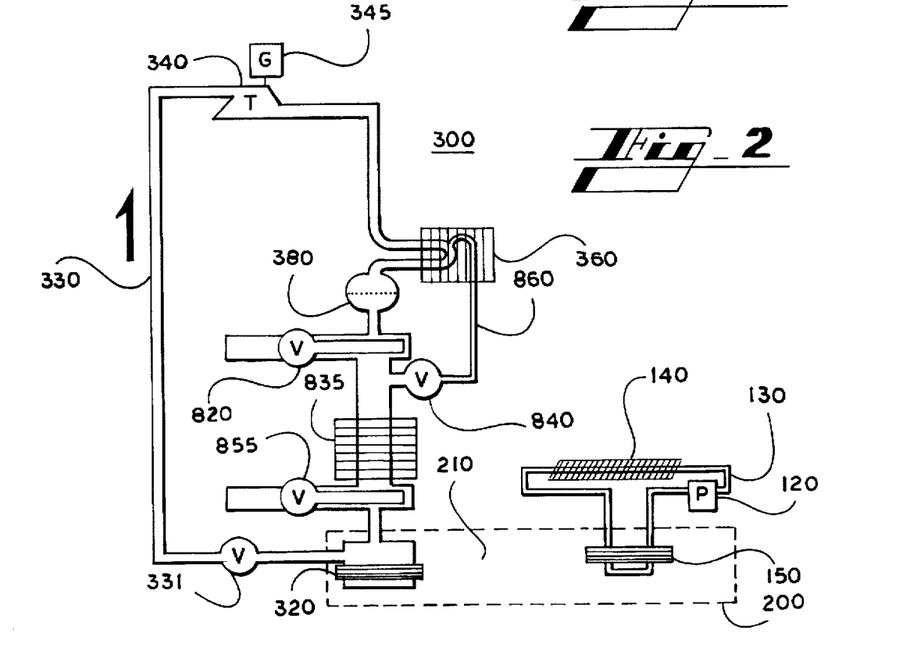
FIG. 2, though similar to FIG. 1, is ambient air cooled.
Figure 3:
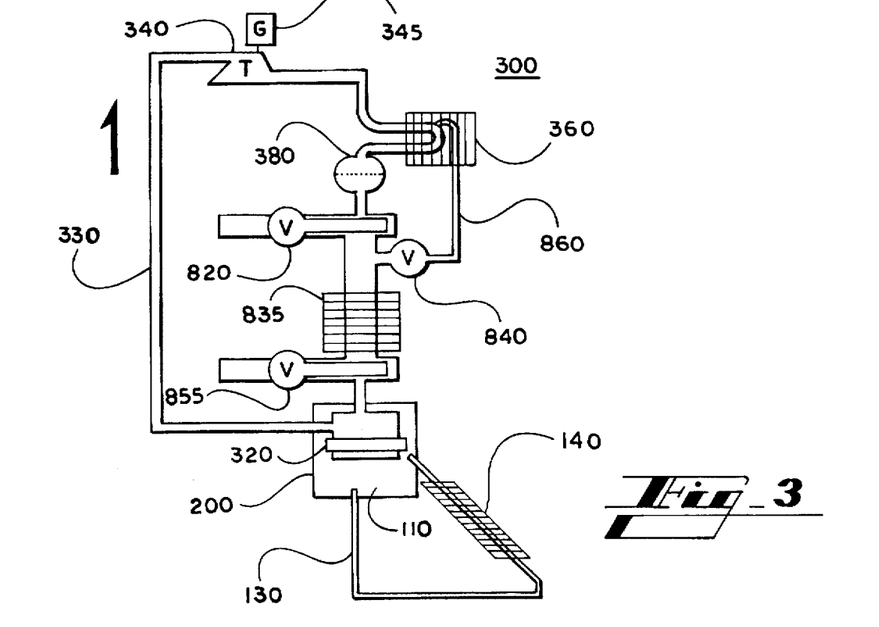
FIG. 3, similar to FIG. 2, in which solar heated transfer fluid and thermal energy storage medium are one.
Figure 4:
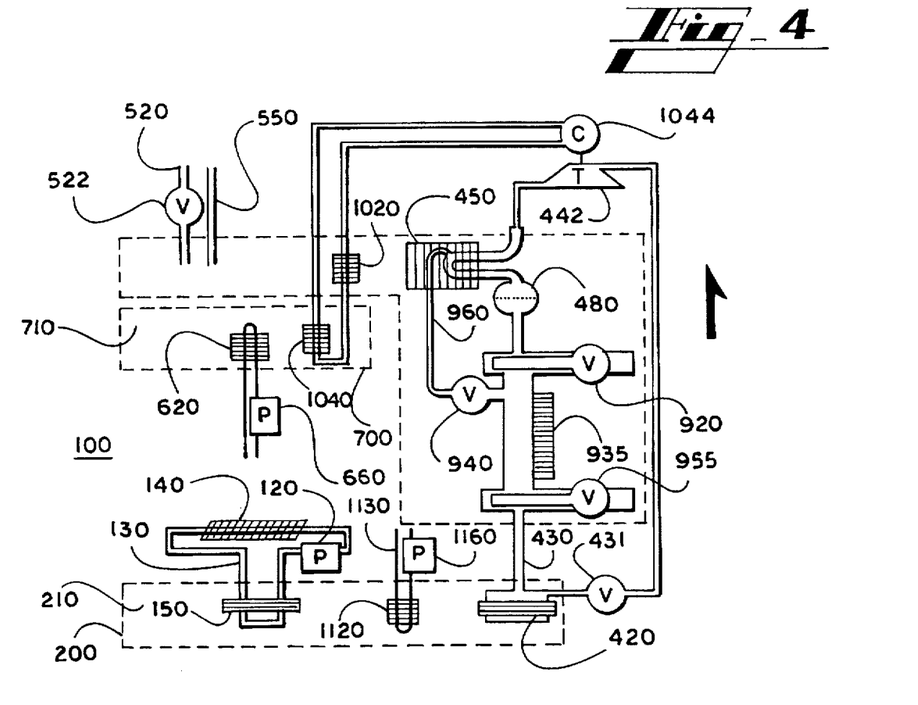
FIG. 4 is solar heated, ambient cooled, powering a heat engine which in turn powers an air conditioning compressor, with storage of thermal energy for continuous operation, and storage of large ice heat sink, producing refrigeration.
Figure 5:
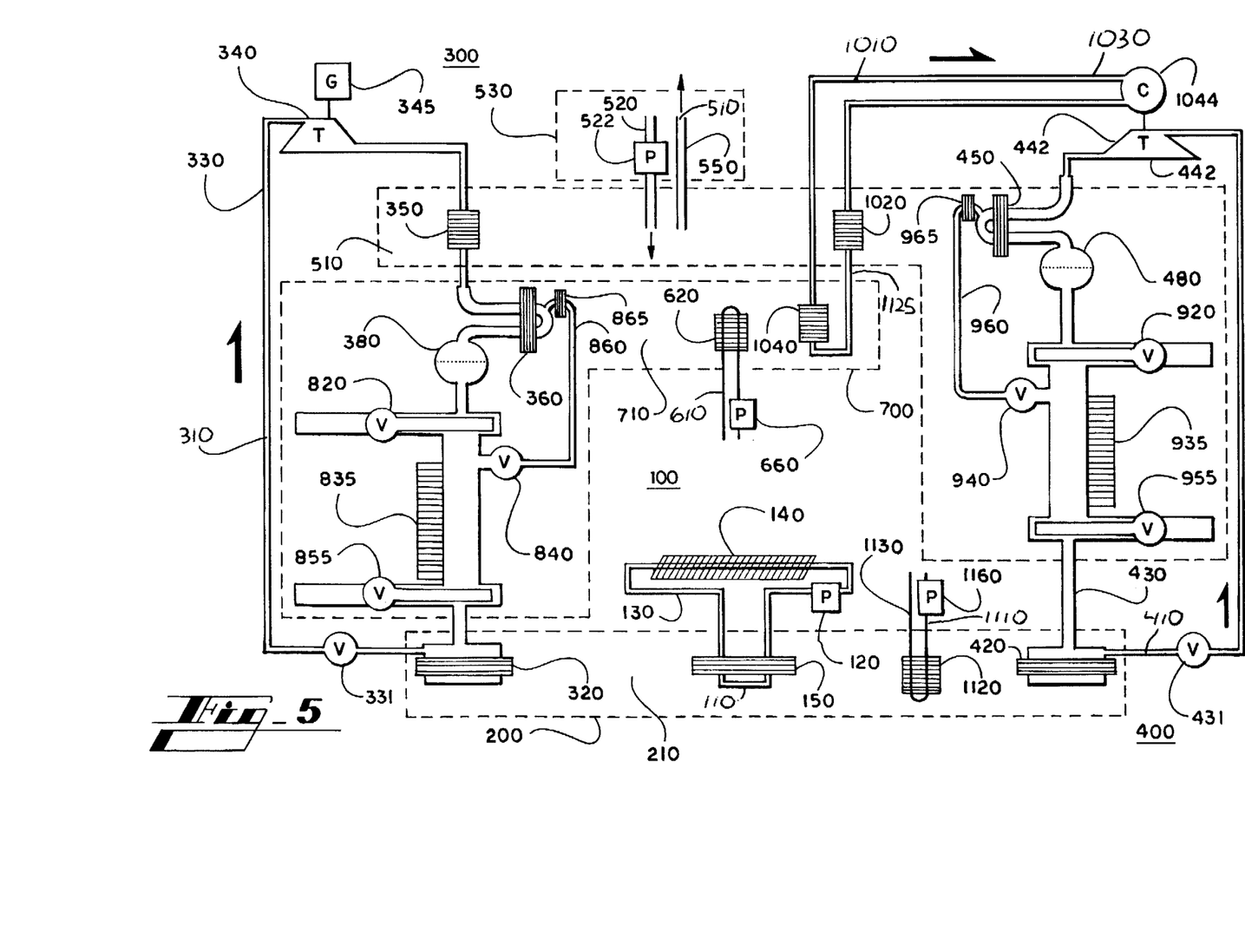
FIG. 5 shows the preferred embodiment, a combination of a heat engine circuit and a refrigeration circuit, capable of providing 24 hour electric power, air conditioning and refrigeration, heating, mechanical power, able to store very large quantities of thermal energy, and able to store very large quantities of ice, for both refrigeration and enhanced heat engine performance and efficiency.
Figure 6:
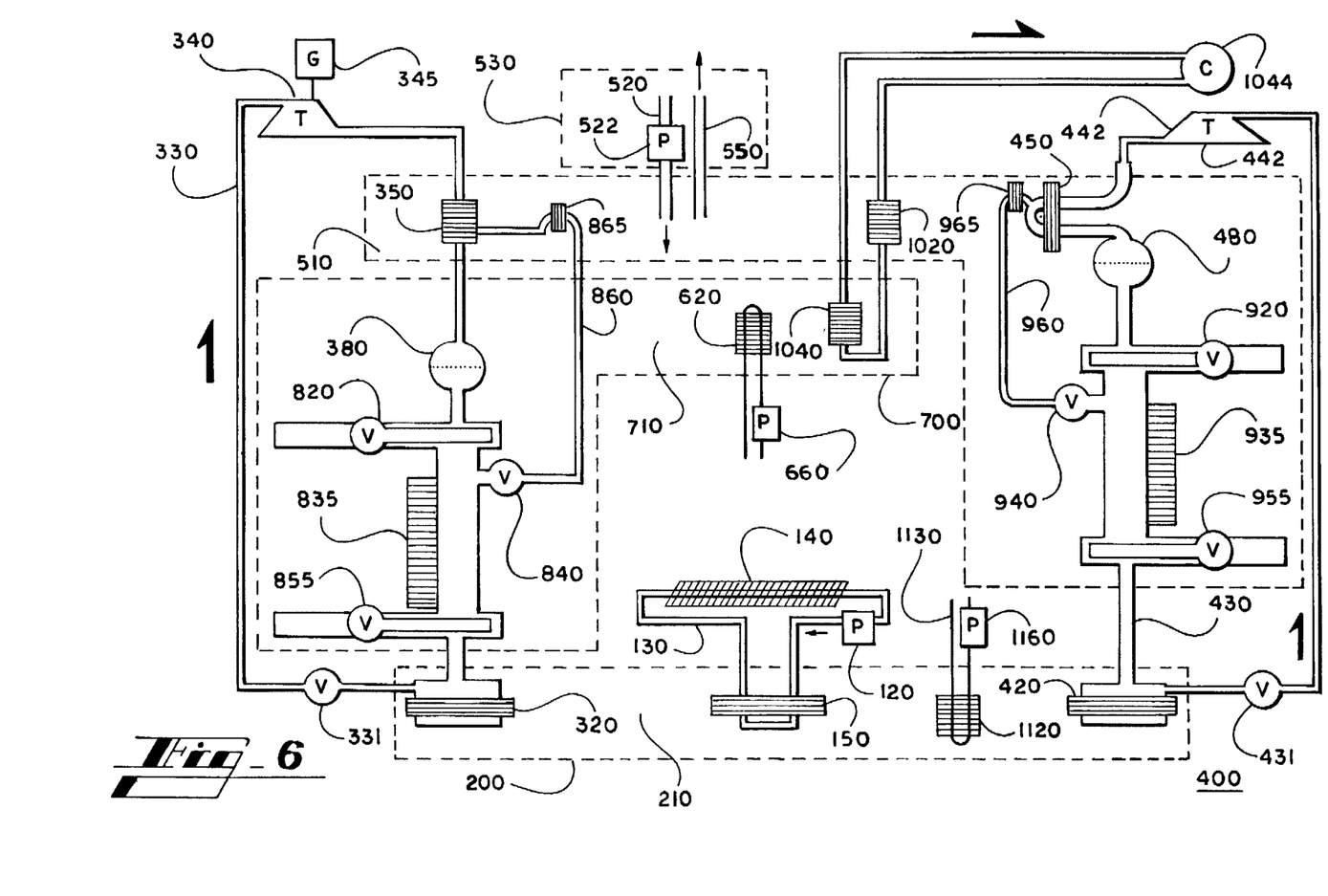
FIG. 6 is similar to FIG. 5, but allows both the heat engine circuit and the refrigeration circuit to each operate with only ambient cooling. The heat engine circuit can also operate in an enhanced state by utilizing the heat sink for greater cooling capacity, and/or for greater energy storage capacity.
Figure 7:
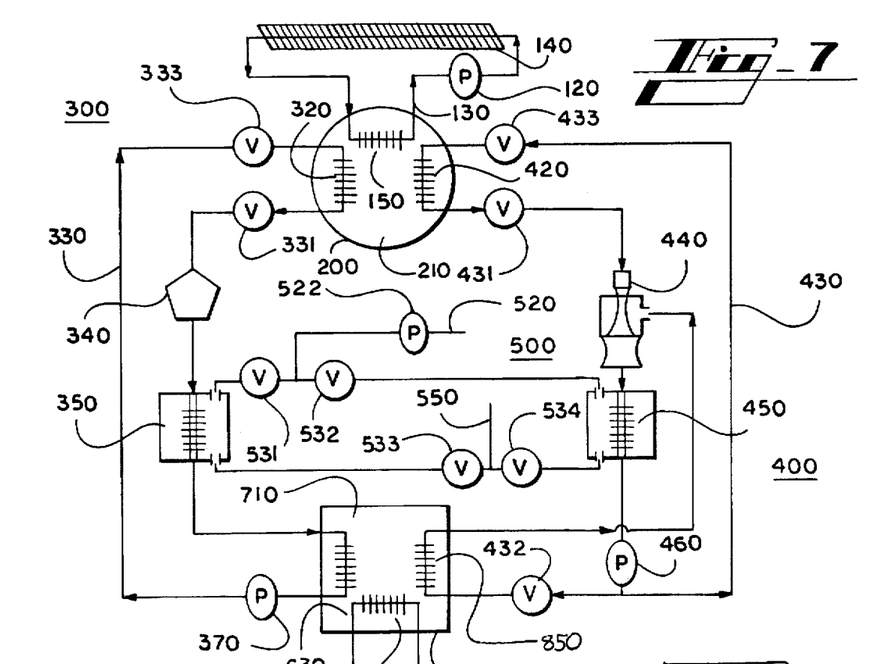
FIG. 7 illustrates an ejector in the refrigeration circuit. 2nd and 3rd pumps can be electric or mechanical pumps, or volumetric exchangers.
Figure 8:
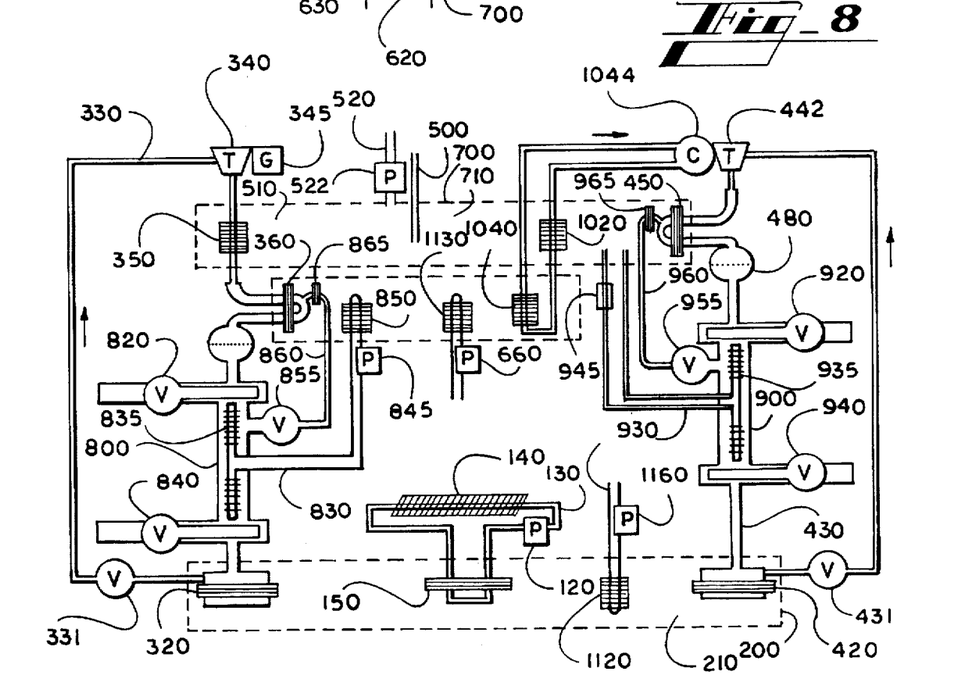
FIG. 8 shows 9th and 12th exchangers within their respective volumetric exchangers, and cooled by transfer fluids.
Figure 9:
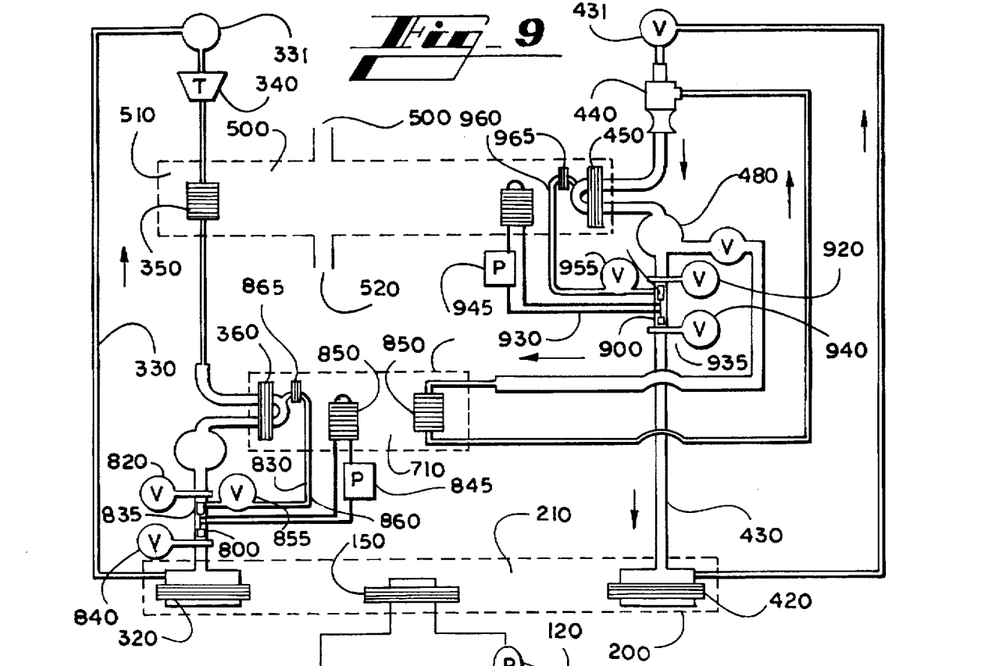
FIG. 9 illustrates an ejector in a refrigeration circuit, using volumetric exchange of high and low pressure refrigerant with intermittent cooling of high pressure vapor.
Figure 10:
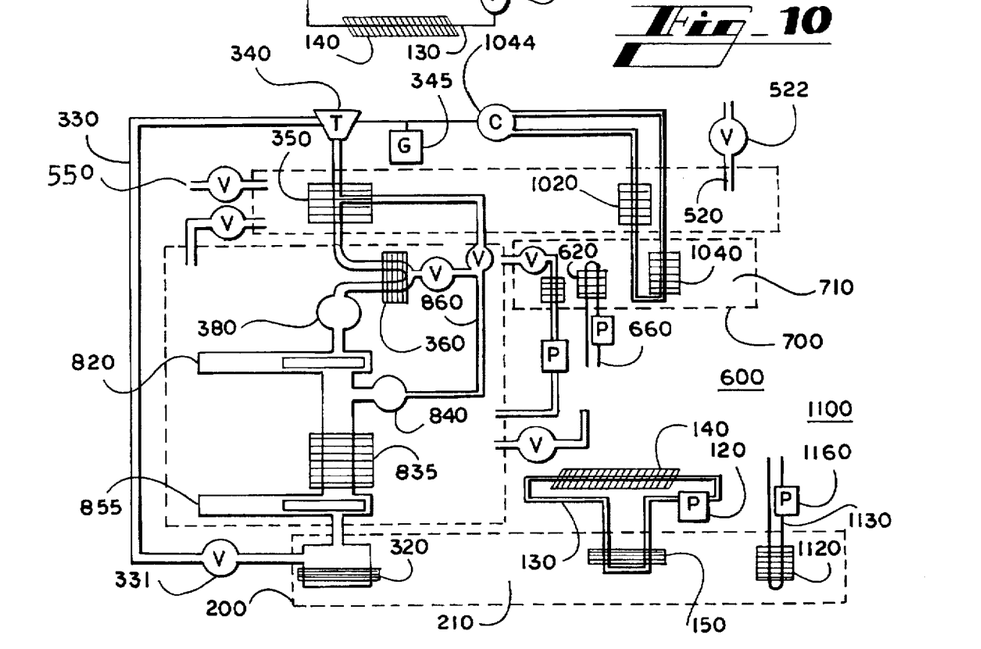
FIG. 10 illustrates a system that makes electric and refrigeration from the same heat engine circuit. The heat engine circuit's energy exchangers and volumetric exchanger can be cooled with ice water or ambient water by use of valves in the 500 system.

The heat engine circuit comprises in circuit: a second thermal energy exchanger for transferring thermal energy from the fluid medium in the 1st media container to a 1st refrigerant; a heat engine for converting the increased volume and subsequent pressure of the 1st refrigerant due, to the increase in the thermal energy of the vaporized 1st refrigerant, to mechanical energy; a first electrical dynamo coupled to the rotational output of the heat engine for the conversion of work produced by the heat engine to electrical power; a 3rd heat exchanger for preliminary cooling to near ambient temperature of the heat engine's exhausted first refrigerant; a 4th energy exchanger for final cooling and condensing of the 1st steam engine's exhausted first refrigerant in an energy sink selectively maintained at the freezing temperature of the 2nd fluid medium; a receiver for holding the liquified 1st refrigerant; and a volumetric exchanger. The volumetric exchanger, as described in FIG. 2 comprises a sixth valve for controlling the liquid refrigerant level in the 1st receiver; an 9th energy exchanger for alternately containing the liquid refrigerant from the 1st receiver, and then containing and cooling the gaseous refrigerant coming from the 2nd energy exchanger; an 8th valve for controlling refrigerant gas exiting the 2nd receiver while the 9th energy exchanger is being filled with liquid refrigerant; a 10th energy exchanger, located between the 8th valve and the 4th energy exchanger; and a 7th valve for controlling the refrigerant passing back and forth between the 9th energy exchanger and the 2nd energy exchanger.

The refrigeration circuit comprises in circuit: a 5th thermal energy exchanger for transferring thermal energy from the fluid media in the 1st media container to a 2nd refrigerant; a 2nd heat engine for converting the thermal energy of the vaporized 2nd refrigerant to mechanical energy; an air conditioning compressor, for compressing a third refrigerant; a 6th energy exchanger in contact with the 3rd container, for cooling and condensing the 2nd heat engine's exhausted 2nd refrigerant; a 3rd receiver for holding the liquified 2nd refrigerant; and a 2nd volumetric exchanger.

The purpose of the volumetric exchanger is: to first act as a receiver for a predetermined volume of condensed, liquified refrigerant and, then by the use of valves or sliding retractable doors, to seal the entrance of the liquid refrigerant; to open an entrance to an enclosed area of higher temperature, higher pressure gaseous refrigerant, and through the use of gravity, or moving parts, to allow the liquid refrigerant to enter and mix with the higher temperature, higher pressure refrigerant in the 2nd or 5th heat exchanger, respectively; and upon completion of the above mentioned tasks, to seal the entrance to the high pressure area, thus trapping a volume of high temperature, high pressure gaseous refrigerant of equal volume to the liquid refrigerant mentioned above; to cool the trapped gaseous refrigerant within the volumetric exchanger's receiver, or, as shown in drawing labeled solar 580, to cool the vaporous refrigerant by use of another heat exchanger in contact with its respective cooling medium, so that the trapped gaseous refrigerant is liquified, with no change in the container's volume, thereby becoming of equal temperature and equal pressure with that of the liquid refrigerant in 1st or 2nd receiver, respectively.

Thus, the volumetric exchanger replaces a pump which would otherwise be necessary to return the lower pressure liquified refrigerant in the 1st or 2nd receiver to the higher pressure heat exchanger in contact with the heated medium in the first container.

It should be understood that variations in the methods and types of thermal energy collection apparatus used will necessarily require minor adaptations, additions and deletions, to the solar collection circuit. These modifications may occur to those skilled in the art without departing from the scope and spirit of the amended claims.

Examples of thermal energy collections apparatus include, but are not limited to: a windmill powering an electrical generator, whose electricity is used to heat a resistance coil which converts electricity to thermal energy; an open loop solar collection circuit which heats a fluid medium and whose medium is directly pumped into the 1st media storage container, eliminating 1st heat exchanger; thermal energy apparatus which recover thermal energy from internal combustion engines; thermal energy apparatus which recover thermal energy from factory processes which release heat; mobile or fixed thermal energy distribution stations which exchange heated thermal energy storage media for cooled thermal energy storage media, thus eliminating or bypassing most or all of the solar collection circuit; solar collection apparatus which rely solely on the size, shape and configuration of its pipes or tubing to effect a movement of its fluid contents, thus eliminating the mechanical fluid pump from the solar collection circuit.

It should be further understood that mechanical energy, or work, produced by the heat engine may be converted to electricity by coupling an electrical generator, dynamo, or alternator to the rotational output of the heat engine.

Additionally, the use of any means of storing the energy output of the alternator, generator, or dynamo, including storing of electricity in electric storage batteries for use as a buffer between high and low levels of electric power production and consumption may occur to those skilled in the art without departing from the scope and spirit of the amended claims.

It should be further understood that deletion of the 3rd energy exchanger may occur to those skilled in the art without departing from the scope and spirit of the amended claims. It should be understood that the addition or deletion of a thermal energy exchanger on pipe 860, cooled by medium in the 2nd container, may occur to those skilled in the art without departing from the scope and spirit of the amended claims. Likewise, it should be understood that the addition or deletion of a thermal energy exchanger on pipe 960, cooled by ambient medium in the 3rd container, may occur to those skilled in the art without departing from the scope and spirit of the amended claims.

By storing the absence of heat in a fluid, the energy conversion and storage system of the present invention can use the unique property of water referred to as latent heat of fusion, which is the amount of energy required by ice, at 32 degrees F. to change from a solid to a liquid state, and vice versa. One pound of ice (made from water) at 32 degrees, under normal conditions, must absorb 144 BTU to melt completely. The heat sink is thus intended to operate at, or just below, the freezing temperature of its fluid media.

Solar air conditioning

Additionally, the energy conversion and storage system of the present invention, in each embodiment, may optionally include a cooling circuit. The cooling circuit, including a transfer fluid, is used to transfer thermal energy in an enclosed space to the second medium. The cooling circuit comprises in circuit: an eighth thermal energy heat exchanger for transferring thermal energy from the transfer fluid to the second medium (energy sink); a ninth thermal energy heat exchanger of the conventional type (not shown) for transferring thermal energy from the enclosed space to the transfer fluid; and a conventional pump (not shown) for circulating the transfer fluid through the eighth and ninth thermal energy heat exchangers.

In a second embodiment of the present invention, the energy conversion and storage system of the present invention includes a solar collection circuit for capturing solar energy as thermal energy while the sun is shining, a heat engine circuit for converting the thermal energy captured by the solar collection circuit to mechanical energy, and a refrigeration circuit for converting the thermal energy captured by the solar collection circuit to a thermal energy sink.

Particularly, in the second embodiment, solar collection circuit includes a solar collector, a first thermal energy heat exchanger, a first thermally insulated tank for holding a fluid medium, and a pump for circulating a transfer fluid through the solar collector and the first thermal energy heat exchanger. The heat engine circuit comprises in circuit: a second thermal energy exchanger for transferring thermal energy from the fluid medium in the first holding tank to a first refrigerant, a heat engine for converting the thermal energy of the vaporized first refrigerant to mechanical energy; a third thermal energy heat exchanger for preliminary cooling of the exhausted first refrigerant to near ambient temperature; a fourth thermal energy heat exchanger for condensing the exhausted first refrigerant in an energy sink maintained at or below the freezing temperature of a second fluid medium; a pump for returning the condensed first refrigerant to the second thermal energy heat exchanger; and valves and check valves for controlling the flow of the first refrigerant throughout the heat engine circuit. The refrigeration circuit comprises in circuit: a fifth thermal energy heat exchanger for transferring thermal energy from the heated first fluid medium to a second refrigerant; an ejector for converting the thermal energy in the vaporized second refrigerant to refrigeration; a sixth thermal energy heat exchanger for condensing the second refrigerant; a seventh thermal energy heat exchanger for absorbing heat from a second media functioning as heat sink, in reaction to the partial vacuum produced by the ejector; a pump for returning the condensed second refrigerant to the fifth thermal energy heat exchanger; and valves and check-valves for controlling the flow of the second refrigerant throughout the refrigeration circuit.

Thus in the second embodiment, the solar energy is first stored by the heated first medium as thermal energy, after which a portion of the stored thermal energy is converted by the ejector to refrigerate a second media, in which the absence of heat is preserved by insulation. The difference in temperature, between the heated first media and the refrigerated second medium, provides the high and low pressures, respectively, obtainable with the chemical class called Refrigerants, necessary for improved efficiency in operation of the heat engine.

The continual operation of the present invention is dependant upon an external energy source only and solely for the intermittent infusion of thermal energy into the first media. The heat engine continues to operate effectively in the absence of an external thermal energy source for as long as: the first media retains the minimum amount of thermal energy necessary to effectively heat the first refrigerant; and the second media has not fully absorbed the thermal energy necessary to attain its heat of fusion. A design, in balance with projected electrical, refrigeration, heating, and mechanical power consumption, can preserve longevity of power reserves through the storage and preservation of the condition of absence of heat, or through the timely use of the refrigeration circuit.

In a third embodiment of the present invention, the energy conversion and storage system of the present invention includes a solar collection circuit for capturing solar energy as thermal energy while the sun is shining, and a heat engine circuit for converting a portion of the thermal energy captured by the solar collection circuit to mechanical energy.

Particularly, in the third embodiment, the solar collection circuit includes a solar collector, a first thermal energy heat exchanger, a first thermally insulated container for holding a fluid medium, and a means for circulating a fluid through the solar collector and the first thermal energy heat exchanger.

The heat engine circuit comprises in circuit: a second thermal energy exchanger for transferring thermal energy from the fluid medium in the 1st media container to a 1st refrigerant; a heat engine for converting the increased volume and subsequent pressure of the 1st refrigerant, due to the increase in the thermal energy of the vaporized 1st refrigerant, to mechanical energy; a first electrical dynamo coupled to the rotational output of the heat engine for the conversion of work produced by the heat engine to electrical power; a 4th energy exchanger for cooling and condensing of the 1st steam engine's exhausted first refrigerant in an energy sink; a receiver for holding the liquified 1st refrigerant; and a volumetric exchanger.

At ambient temperatures above 68 degrees Fahrenheit, ice and water become a more efficient storage medium of thermal energy than does hot water at atmospheric pressures. Thus, at 69 degrees F., and atmospheric pressure, a greater amount of thermal energy may be absorbed by one pound of ice at 32 degrees F., than may be extracted from one pound of water cooled from 212 degrees to 69 degrees. At ambient cooling temperature above 68 degrees F., ice becomes more efficient as a storage medium than is boiling water.

Still further objects and advantages will become apparent from a consideration of the ensuing description and accompanying drawings.

BRIEF DESCRIPTION OF THE DRAWINGS

FIG. 1 is solar heated, ambient water cooled, powering a heat engine with an electric generator, with energy storage for continual operation.

| PARTS LIST | |
|---|---|
| energy collection circuit | 100 |
| 1st transfer fluid | 110 |
| 1st pump | 120 |
| 1st pipe circuit | 130 |
| solar collector | 140 |
| 1st energy exchanger | 150 |
| 1st energy storage media container | 200 |
| 1st energy storage medium | 210 |
| 2nd energy storage media container | 700 |
| 2nd energy storage medium | 710 |
| heat engine circuit | 300 |
| 1st refrigerant | 310 |
| 2nd energy exchanger | 320 |
| 2nd pipe circuit | 330 |
| 1st valve | 331 |
| 1st check-valve | 333 |
| 1st heat engine | 340 |
| electric generator | 345 |
| 3rd energy exchanger | 350 |
| 4th energy exchanger | 360 |
| 2nd pump | 370 |
| 1st receiver | 380 |
| 1st volummetric exchanger | 800 |
| 6th valve | 820 |
| 6th pipe circuit | 830 |
| 0th energy exchanger | 835 |
| 7th valve | 840 |
| 4th pump | 845 |
| 11th energy exchanger | 850 |
| 8th valve | 855 |
| pipe | 860 |
| 10th energy exchanger | 865 |
| refrigeration circuit | 400 |
| 2nd refrigerant | 410 |
| 5th energy exchanger | 420 |
| 3rd pipe circuit | 430 |
| 2nd valve | 431 |
| 3rd valve | 432 |
| 2nd check-valve | 433 |
| ejector | 440 |
| 2nd heat engine | 442 |
| 6th energy exchanger | 450 |
| 3rd pump | 460 |
| 7th energy exchanger | 470 |
| 2nd receiver | 480 |
| 2nd volummetric exchanger | 900 |
| 9th valve | 920 |
| 7th pipe circuit | 930 |
| 12th energy exchanger | 935 |
| 10th valve | 940 |
| 5th pump | 945 |
| 11th valve | 955 |
| pipe | 960 |
| 13th energy exchanger | 965 |
| compressor circuit | 1000 |
| 3rd refrigerant | 1010 |
| a/c condenser | 1020 |
| refrigerant control | 1025 |
| 8th pipe circuit | 1030 |
| a/c evaporator | 1040 |
| a/c compressor | 1044 |
| condensing circuit | 500 |
| ambient medium | 510 |
| ambient medium inlet | 520 |
| 6th pump | 522 |
| 4th pipe circuit | 530 |
| 4th valve | 531 |
| 5th valve | 532 |

-continued

| PARTS LIST | |
|---|---|
| 3rd check-valve | 533 |
| 4th check valve | 534 |
| ambient medium outlet | 550 |
| 1st auxiliary circuit | 600 |
| 3rd transfer fluid | 610 |
| 14th exchanger | 620 |
| pipe circuit | 630 |
| 15th exchanger | 640 |
| enclosed space | 650 |
| 7th pump | 660 |
| 2nd auxiliary circuit | 1100 |
| 4th transfer fluid | 1110 |
| 16th energy exchanger | 1120 |
| 10th pipe circuit | 1130 |
| 2nd enclosed space | 1150 |
| 8th pump | 1160 |
| 17th energy exchanger | 1170 |

DETAILED DESCRIPTION OF THE PREFERRED EMBODIMENT

Figure 1:
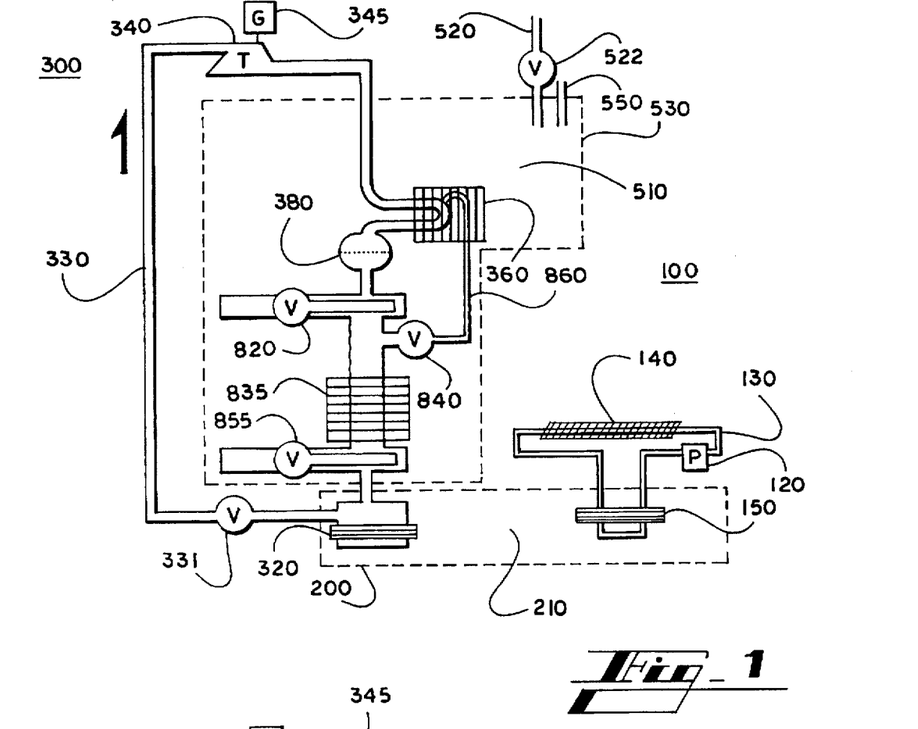
FIG. 1 is a block diagram of the 3rd embodiment of the energy conversion and storage system of the present invention.

Referring now in detail to the drawings, in which like numerals indicate like elements throughout the views, FIG. 1 is a block diagram of a continual energy conversion and storage system 1 of the present invention. The energy conversion and storage system 1 captures thermal energy from solar collectors when the sun is shining, stores thermal energy as a heated fluid, converts a portion of the stored thermal energy to mechanical energy, converts a second portion of the stored thermal energy to a thermal energy sink, and stores a portion of the thermal energy sink for later use.

The energy conversion and storage system 1 comprises: energy collection circuit 100 including first thermal energy transfer fluid 110; first thermal energy storage container 200, including first thermal energy storage medium 210; heat engine circuit 300, including first refrigerant 310; refrigeration circuit 400, including second refrigerant 410; condensing circuit 500, including second thermal energy transfer fluid 510; cooling circuit 600, including third thermal energy transfer fluid 610; and second thermal energy storage container 700, including second thermal energy storage medium 710.

In the first embodiment of the present invention, energy collection circuit 100 captures thermal energy of the sun by heating first transfer fluid 110.

Particularly, energy collection circuit 100 comprises: solar collector 140; first pipe-circuit 130; first thermal energy exchanger 150; and first pump 120. First transfer fluid 110 is circulated by first pump 120 through first pipe-circuit 130 to solar collector 140, where fluid 110 absorbs thermal energy from the sun, thereby raising the temperature of fluid 110 above ambient temperature. Heated fluid 110 is forced out of solar collector 140 through first pipe-circuit 130 into first thermal energy exchanger 150 located in contact with first thermal energy storage medium 210 contained by first thermal energy storage receptacle 200, thereby adding thermal energy to first thermal energy storage medium 210.

Heat engine circuit 300 of the first embodiment of the present invention uses first refrigerant 310 to convert the thermal energy in first thermal energy storage medium 210 contained by first thermal energy storage container 200 to mechanical energy. Heat engine circuit 300 comprises in circuit: second thermal energy exchanger 320 in contact with first heated thermal energy storage medium 210 contained by first thermal energy storage container 200; second pipe-circuit 330; first valve 331; first check-valve 332; heat engine 340; third thermal energy exchanger 350; fourth thermal energy exchanger 360 in contact with second thermal energy storage medium 710 contained by second thermal energy storage container 700; and 1st volumetric exchanger 380.

When the sun is shining through the atmosphere to solar collector 140, thermal energy is captured by solar collector 140 and pumped through first thermal energy exchanger 150, where the thermal energy is transferred to first thermal energy storage medium 210, contained by first thermal energy storage container 200. First thermal energy container 200 is heavily insulated, and stores captured thermal energy for both immediate and later use.

Upon demand, thermal energy stored in first thermal energy storage medium 210, contained by first thermal energy storage container 200, is transferred through second thermal energy exchanger 320 to first liquid refrigerant 310. This transfer of energy vaporizes first refrigerant 310. The vapor phase of first refrigerant 310 is forced by the greatly increased vapor pressure through first valve 331 and second pipe-circuit 330 to heat engine 340. Heat engine 340 may be any suitable heat engine such as a piston engine or a turbine. Heat engine 340 converts the thermal energy contained by heated first refrigerant 310 into mechanical energy. The exhausted vapor phase of first refrigerant 310 is propelled through second pipe-circuit 330 to third thermal energy exchanger 350 where it gives up a portion of it's unconverted thermal energy to ambient air or water circulated through third thermal energy exchanger 350, and continues through second pipe-circuit 330 to fourth thermal energy exchanger 360 in contact with second thermal energy storage medium 710 contained by second thermal energy storage container 700. It is in the 4th energy exchanger that the vapor phase of 1st refrigerant 310 is condensed back to its liquid state 310. Liquified 1st refrigerant 310 is collected by 1st receiver 380, from where it is fed to 1st volumetric exchanger 800.

6th Valve 820 opens to allow a predetermined portion of the liquified refrigerant 310 of 1st receiver 380 to enter 9th energy exchanger 835. 7th Valve 840 opens simultaneously with 6th valve 820 to allow refrigerant vapor in 9th exchanger 835 to be displaced by liquified refrigerant. Pipe 860 returns vaporous refrigerant to 10th exchanger 865, delivering liquified refrigerant 310 to 1st receiver 380. 6th valve 820 and 7th valve 840 close. 8th valve 855 opens, allowing liquified refrigerant 310 to enter 2nd exchanger 320, thereby completing its circuit. Gaseous refrigerant 310 from 2nd exchanger 320 displaces liquid refrigerant in 9th exchanger 835. 8th valve 855 closes, thereby trapping, in 9th exchanger 835, a volume of heated, vaporous 1st refrigerant 310, which is then cooled and condensed to a liquid.

It should be understood that 7th valve 840, pipe 860, and 10th exchanger 865 may be unnecessary under some circumstances in which 9th exchanger 835 is efficient enough to cool its gaseous contents within the time frame allowed, and their elimination may occur to those skilled in the art without departing from the scope and spirit of the amended claims.

Refrigeration circuit 400 of the first embodiment of the present invention uses second refrigerant 410 to convert the thermal energy, in first thermal energy storage medium 210, contained by first thermal energy storage container 200, to a thermal energy sink in which thermal energy is removed from 2nd thermal energy storage container 700 containing 2nd thermal energy storage medium 710.

The refrigeration circuit 400 comprises in circuit: fifth thermal energy exchanger 420 in contact with first thermal energy storage media 210 contained by first thermal energy storage container 200; third pipe-circuit 430; second valve 431; second heat engine 442; sixth thermal energy exchanger 450 in contact with ambient medium 510; 2nd receiver 480; and 2nd volumetric exchanger 900.

Upon demand, thermal energy stored in first thermal energy storage medium 210, contained by first thermal energy storage container 200, is transferred through 5th thermal energy exchanger 420 to first liquid refrigerant 410. This transfer of energy vaporizes 2nd refrigerant 410. The vapor phase of 2nd refrigerant 410 is forced by the greatly increased vapor pressure through 2nd valve 431 and 3rd pipe-circuit 430 to 2nd heat engine 442. 2nd heat engine 442 may be any suitable heat engine such as a piston engine or a turbine. 2nd heat engine 442 converts the thermal energy contained by heated second refrigerant 410 into mechanical energy. The exhausted vapor phase of 2nd refrigerant 410 is propelled through 3rd pipe-circuit 430 to 6th thermal energy exchanger 450 where it gives up it's unconverted thermal energy to ambient medium 510. It is in the 6th energy exchanger that the vapor phase of 2nd refrigerant 410 is condensed back to its liquid state 410. Liquified 2nd refrigerant 410 is collected by 2nd receiver 480, from where it is fed to 2nd volumetric exchanger 900. 9th Valve 920 opens to allow a predetermined portion of the liquified refrigerant 410 of 2nd receiver 480 to enter 12th energy exchanger 935. 10th Valve 940 opens simultaneously with 9th valve 920 to allow refrigerant vapor in 12th exchanger 935 to be displaced by liquified refrigerant. Pipe 960 returns vaporous refrigerant to 13th exchanger 965, delivering liquified refrigerant 410 to 2nd receiver 480. 9th valve 920 and 10th valve 940 close. 11th valve 955 opens, allowing liquified refrigerant 410 to enter 5th exchanger 420, thereby completing its circuit. Gaseous refrigerant 410 from 5th exchanger 420 displaces liquid refrigerant in 12th exchanger 935. 10th valve 955 closes, thereby trapping, in 12th exchanger 935, one volume of heated, vaporous 2nd refrigerant 410, which is then cooled and condensed to a liquid.

The mechanical energy produced by 2nd heat engine 442 is conveyed to air conditioning compressor 1044, of the type well known to those skilled in the art, which uses mechanical energy derived from 2nd heat engine 442 to compress a third refrigerant 1010, in compressor circuit 1000. Compressor circuit 1000 is comprised of 3rd refrigerant 1010; condenser 1020 in contact with ambient medium 510; refrigerant control 1025, of the conventional type (not shown); 9th pipe circuit 1030; and evaporator 1040 in contact with 2nd medium 710.

Pipe circuit 1030 connects, in circuit, compressor 1044, 3rd refrigerant 1010, condenser 1020, refrigerant control 1025 and evaporator 1040. Compressor 1044, condenser 1020, refrigerant control 1025, pipe circuit 1030, and evaporator 1040, form a refrigeration circuit of a type well known to those skilled in the art. Compressor 1044 compresses 3rd refrigerant 1010. 3rd refrigerant 1010 is cooled and condensed in condenser 1020. Release of liquified refrigerant 1010 into evaporator 1040 is controlled by refrigerant control 1025. Compressor 1044 maintains a low pressure in the evaporator 1040, and refrigerant 1010 boils, absorbing heat from evaporator 1040.

The purpose of compressor circuit 1000 is to remove thermal energy from 2nd medium 710, and to release that energy to ambient medium 510.

It should be understood that compressor circuit 1000 represents one of many refrigeration means well known to those skilled in the art, and as such, it may occur to those skilled in the art that means for refrigeration other than those recited here may serve as well or better, depending upon the load requirements and thermal power available, and that the substitution of another method of refrigeration in place of a method of refrigeration recited herein may occur to those skilled in the art without departing from the spirit and scope of the amended claims.

Condensing circuit 500 uses ambient medium 510 to remove thermal energy from thermal energy exchangers 350, 450, 935, 965, and 1020. Condensing circuit 500 comprises in circuit: transfer fluid inlet 520; fourth pipe-circuit 530; fourth pump 522; and ambient medium outlet 550.

During operation of heat engine circuit 300 and/or refrigeration circuit 400, ambient medium enters fourth pump 522 through ambient medium inlet 520, moves through fourth pipe-circuit 530 in contact with thermal energy exchangers 350, 450, 935, 965, and 1020. Ambient medium 510 exits condensing pipe circuit 530 through ambient medium outlet 550. Ambient medium 510 can be ambient water or air.

First auxiliary circuit 600 of the present invention is used to transfer thermal energy in an enclosed space of a conventional type (not shown) to the energy sink. Auxiliary circuit 600 comprises: third thermal energy transfer fluid 610; seventh thermal energy exchanger 620, in contact with second thermal energy storage medium 710, for transferring thermal energy from third transfer fluid 610 to second thermal energy storage medium 710; 5th pipe circuit 630 of the conventional type (not shown); enclosed space 650 of the conventional type (not shown); eighth thermal energy exchanger 640 of the conventional type (not shown) for transferring thermal energy from enclosed space 650 to third transfer fluid 610; fifth pump 660 of the conventional type (not shown) for circulating third transfer fluid 610 through seventh 620 and eighth 640 thermal energy exchangers. Third transfer fluid 610 can be water.

Second auxiliary circuit 1100 of the present invention comprises: 16th energy exchanger 1120, in contact with 1st energy storage medium 210; 10th pipe circuit 1130 including 4th transfer fluid 1110; 2nd enclosed space 1150; 8th pump 1160; and 17th energy exchanger 1170. The purpose of 2nd auxiliary circuit 1100 is to 2nd heat enclosed space 1150 by transferring thermal energy from 1st storage medium 210.

The first embodiment of the energy conversion and storage system 1 uses water for first storage medium and water for second storage medium.

DETAILED DESCRIPTION OF THE THIRD EMBODIMENT

Referring now in detail to the drawings, in which like numerals indicate like elements throughout the views, FIG. 1 is a block diagram of a continual energy conversion and storage system 1 of the present invention. The energy conversion and storage system 1 captures thermal energy from solar collectors when the sun is shining, stores thermal energy as a heated fluid, converts a portion of the stored thermal energy to mechanical energy.

The energy conversion and storage system 1 comprises: energy collection circuit 100 including first thermal energy transfer fluid 110; first thermal energy storage container 200, including first thermal energy storage medium 210; heat engine circuit 300, including first refrigerant 310; and condensing circuit 500, including second thermal energy transfer fluid 510.

In the third embodiment of the present invention, energy collection circuit 100 captures thermal energy of the sun by heating first transfer fluid 110.

Particularly, energy collection circuit 100 comprises: solar collector 140; first pipe-circuit 130; first thermal energy exchanger 150; and first pump 120. First transfer fluid 110 is circulated by first pump 120 through first pipe-circuit 130 to solar collector 140, where fluid 110 absorbs thermal energy from the sun, thereby raising the temperature of fluid 110 above ambient temperature. Heated fluid 110 is forced out of solar collector 140 through first pipe-circuit 130 into first thermal energy exchanger 150 located in contact with first thermal energy storage medium 210 contained by first thermal energy storage receptacle 200, thereby adding thermal energy to first thermal energy storage medium 210.

Heat engine circuit 300 of the third embodiment of the present invention uses first refrigerant 310 to convert the thermal energy in first thermal energy storage medium 210 contained by first thermal energy storage container 200 to mechanical energy. Heat engine circuit 300 comprises in circuit: second thermal energy exchanger 320 in contact with first heated thermal energy storage medium 210 contained by first thermal energy storage container 200; second pipe-circuit 330; first valve 331; heat engine 340; fourth thermal energy exchanger 360; and 1st volumetric exchanger 800.

When the sun is shining through the atmosphere to solar collector 140, thermal energy is captured by solar collector 140 and pumped through first thermal energy exchanger 150, where the thermal energy is transferred to first thermal energy storage medium 210, contained by first thermal energy storage container 200. First thermal energy container 200 is heavily insulated, and stores captured thermal energy for both immediate and later use.

Upon demand, thermal energy stored in first thermal energy storage medium 210, contained by first thermal energy storage container 200, is transferred through second thermal energy exchanger 320 to first liquid refrigerant 310. This transfer of energy vaporizes first refrigerant 310. The vapor phase of first refrigerant 310 is forced by the greatly increased vapor pressure through first valve 331 and second pipe-circuit 330 to heat engine 340. Heat engine 340 may be any suitable heat engine such as a piston engine or a turbine. Heat engine 340 converts the thermal energy contained by heated first refrigerant 310 into mechanical energy. The exhausted vapor phase of first refrigerant 310 is propelled through second pipe-circuit 330 to fourth thermal energy exchanger 360. It is in 4th energy exchanger 360 that the vapor phase of 1st refrigerant 310 is condensed back to its liquid state 310. Liquified 1st refrigerant 310 is collected by 1st receiver 380, from where it is fed to 1st volumetric exchanger 800.

volumetric exchanger

6th Valve 820 opens to allow a predetermined portion of the liquified refrigerant 310 of 1st receiver 380 to enter 9th energy exchanger 835. 7th Valve 840 opens simultaneously with 6th valve 820 to allow refrigerant vapor in 9th exchanger 835 to be displaced by liquified refrigerant. Pipe 860 returns vaporous refrigerant to 4th exchanger 360, delivering liquified refrigerant 310 to 1st receiver 380. 6th valve 820 and 7th valve 840 close. 8th valve 855 opens, allowing liquified refrigerant 310 to enter 2nd exchanger 320, thereby completing its circuit. Gaseous refrigerant 310 from 2nd exchanger 320 displaces liquid refrigerant in 9th exchanger 835. 8th valve 855 closes, thereby trapping, in 9th exchanger 835, a volume of heated, vaporous 1st refrigerant 310, which is then cooled and condensed to a liquid.

Condensing circuit 500 uses ambient medium 510 to remove thermal energy from thermal energy exchangers 360 and 835. Condensing circuit 500 comprises in circuit: transfer fluid inlet 520; fourth pipe-circuit 530; fourth pump 522; and ambient medium outlet 550.

During operation of heat engine circuit 300 ambient medium enters fourth pump 522 through ambient medium inlet 520, moves through fourth pipe-circuit 530 in contact with thermal energy exchangers 360 and 835. Ambient medium 510 exits condensing pipe circuit 530 through ambient medium outlet 550. Ambient medium 510 can include ambient water or air.

It should be noted that it may occur to those skilled in the art that valve 840 and pipe 860 may be unnecessary if valve 820 incorporates a means for exchange of vaporous refrigerant into receiver 380 while volumetric exchanger 835 is filling with liquified refrigerant. It should be understood that valve 840 and/or pipe 860 may be excluded without departing from the spirit and scope of the amended claims.

I claim:

1. A thermal power system comprising:

a vaporizer for vaporizing a thermal fluid at a high pressure having a vaporizer output supplying high pressure thermal fluid, an expansion device in fluid communication with said vaporizer output for expanding said high pressure thermal fluid and providing a low pressure thermal fluid at an output of said expansion device, said expansion device also supplying useful mechanical power, a first heat exchanger connected to said output of said expansion device for cooling and condensing said low pressure thermal fluid, producing condensed thermal fluid, a reservoir connected to said first heat exchanger for receiving said condensed thermal fluid having an outlet controlled by a first valve, a second heat exchanger positioned to accept said condensed thermal fluid from said reservoir by gravity when said first valve is opened, said second heat exchanger including at its outlet a second valve, said vaporizer positioned and connected to said second valve to accept said condensed thermal fluid by gravity from said second heat exchanger when said second valve is opened, whereby said first and second valves may be operated to permit intermittent passage of said condensed thermal fluid from said reservoir to said vaporizer without causing substantial reduction of said pressure in said vaporizer.

2. A method of operating a power plant comprising the steps of:

vaporizing a thermal fluid to provide a high pressure thermal fluid in a vaporizer, expanding said thermal fluid to produce useful mechanical power and a low pressure thermal fluid, cooling and condensing said thermal fluid in a heat exchanger to provide a condensed thermal fluid, passing and accumulating said condensed thermal fluid into a reservoir providing accumulated condensed thermal fluid, intermittently passing, using gravity, said accumulated condensed thermal fluid through a first valve to a second heat exchanger by opening said first valve, closing the first valve, passing said accumulated condensed thermal fluid from said second heat exchanger through a second valve, using gravity, to said vaporizer, and closing said second valve.

3. A thermal power system comprising:

a vaporizer for vaporizing a thermal fluid at a high pressure having a vaporizer output supplying high pressure thermal fluid;

at least one organic Rankine cycle heat engine which receives heat from said high pressure thermal fluid and outputs waste heat to an ambient temperature medium for generating useful mechanical power;

a heat pump driven by at least one of said at least one organic Rankine cycle heat engines for removing heat from a low temperature thermal storage medium and releasing heat to said ambient temperature medium; wherein said low temperature thermal storage medium is suitable to provide a heat sink for at least one of said at least one organic Rankine cycle heat engines;

at least one of said at least one organic Rankine cycle heat engines which receives heat from said ambient temperature medium and outputs waste heat to said low temperature thermal storage medium for generating useful mechanical power;

an electric generator operable to convert said useful mechanical power from at least one of said at least one organic Rankine cycle heat engines into electricity.

4. An apparatus for deriving useful energy from available sunlight, comprising:

a collector for collecting sunlight and heating a first thermal fluid;

a first conduit and a pump for circulating said first thermal fluid between said collector and a high temperature thermal storage medium;

at least one organic Rankine cycle heat engine which receives heat from said high temperature thermal storage medium and outputs waste heat to an ambient temperature medium for generating useful mechanical power;

an electric generator operable to convert said useful mechanical power from at least one of said at least one organic Rankine cycle heat engines into electricity;

a heat pump driven by at least one of said at least one organic Rankine cycle heat engines for removing heat from a low temperature thermal storage medium and releasing heat to said ambient temperature medium; wherein at least one of said at least one organic Rankine cycle heat engines releases said waste heat to said low temperature thermal storage medium; and wherein said low temperature thermal storage medium is suitable to provide a heat sink for air conditioning and other auxiliary cooling purposes.

5. An apparatus for deriving useful energy from available sunlight, comprising:

a collector for collecting sunlight and heating a first thermal fluid;

a first conduit and a pump for circulating said first thermal fluid between said collector and a high temperature thermal storage medium;

at least one organic Rankine cycle heat engine which receives heat from said high temperature thermal storage medium and outputs waste heat to an ambient temperature medium for generating useful mechanical power;

at least one organic Rankine cycle heat engine which receives heat from said ambient temperature medium and outputs waste heat to said low temperature thermal storage medium for generating useful mechanical power;

an electric generator operable to convert said useful mechanical power from at least one of said at least one organic Rankine cycle heat engines into electricity;

a heat pump driven by at least one of said at least one organic Rankine cycle heat engines for removing heat from a low temperature thermal storage medium and releasing heat to said ambient temperature medium; wherein said low temperature thermal storage medium is suitable to provide a heat sink for air conditioning and other auxiliary cooling purposes.

* * * * *